United States Patent [19]

Ukai et al.

[11] 3,997,674
[45] Dec. 14, 1976

[54] PRESERVATION OF AGRICULTURAL PRODUCTS

[75] Inventors: Nobuo Ukai, Yanagawa; Shingo Ishibashi; Toshio Tsutsumi, both of Kurume; Kyoichi Marakami, Fukuoka, all of Japan

[73] Assignee: Tsukihoshi Kasei Kabushiki Kaisha, Japan

[22] Filed: Feb. 25, 1975

[21] Appl. No.: 552,738

[52] U.S. Cl. ................................. 426/90; 426/93; 426/102; 426/132; 426/300; 426/301; 426/308; 426/309; 426/310; 106/131; 106/134; 106/135; 106/201; 106/199; 106/191; 106/206; 106/207; 106/208; 260/23 R; 260/28.5 R; 260/29.6 B

[51] Int. Cl.² ...................... A23B 7/16; A23B 9/00; A23B 5/06

[58] Field of Search ............. 426/89, 90, 93, 102, 426/132, 125, 96, 308, 309, 310, 300, 301; 106/271, 268, 263, 142, 143, 145, 146, 131, 132, 134, 135, 244, 245, 159, 160, 161, 201, 191, 199, 206, 207, 208; 260/23 R, 28.5 R, 29.6 B

[56] References Cited

UNITED STATES PATENTS 3,323,922  6/1967  Durst .................................. 426/89

*Primary Examiner*—Joseph M. Golian
*Attorney, Agent, or Firm*—Wenderoth, Lind & Ponack

[57] ABSTRACT

A composition comprising a dispersion prepared by dispersing in an aqueous solution of a water-soluble high polymer, such as polysaccharides, a hydrophobic substance selected from the group consisting of hydrophobic solids and hydrophobic and non-volatile liquids, such as natural waxes, is applied as a coating to cover the outer surface of an agricultural product to form a coating membrane upon drying, which membrane has fine continuous microvoids by which the respiration of the agricultural product can be controllably suppressed thereby to effectively preserve the product over a long period.

22 Claims, 2 Drawing Figures

PRESERVATION OF AGRICULTURAL PRODUCTS

BACKGROUND OF THE INVENTION

This invention relates generally to the preservation of agricultural products. More particularly, the invention relates to compositions for surface coating for making possible the preservation of agricultural products over long periods, to a process for preserving agricultural products through the use of these compositions, and to agricultural products thus processed for preservation.

Among agricultural products, vegetables, fruits, and cereals or grains, even during their storage after harvesting, carry on living functions, inspire oxygen from the outside air to carry out respiratory action, and continue vital functions and phenomena as they consume nutrients stored within their structures.

Vegetables, fruits, and cereals (hereinafter referred to as vegetables and (or) the like) after harvesting may be stored in fresh state for long periods preserving them in a state wherein they are sustained at minimal level of vital functions and are rendered into a dormant state, the consumption of stored nutriments in their structure is reduced to a minimum degree, and their structural compositions immediately after harvesting are maintained as much as possible.

In general, long-period preservation can be accomplished by utilizing such principles as (1) suppression of respiration, (2) prevention of evaporation of water content, and (3) prevention of change of quality or deterioration due to microorganisms.

Examples in the prior arts of utilization of these principles in specific form for practical preservation are (1) suppression of respiration by low-temperature storage, (2) suppression of respiration by lowering the partial pressure of oxygen in the preserving atmosphere, (3) suppression of respiration and prevention of evaporation of water content by packaging in film envelopes, and (4) suppression of respiration and prevention of evaporation of water content by coating the surfaces of the commodities.

In the method (1) of suppressing respiration by low-temperature storage, the commodity, or vegetable and the like, is preserved at such a low temperature as possible after harvesting without physiological damage due to low temperature with the aim of preserving the commodity over a long period. In general, the respiratory activity of a plant becomes very low at temperatures close to 0° C, and the quantity of respiration increases 2 to 4 times with a temperature rise of 10° C; therefore, low-temperature storage is a very effective measure for long period preservation. This method, however, requires great expense for installation of equipment, and, moreover, the maintenance of low-temperature conditions also adds to the operational cost. Furthermore, when, at the stage of transferring the commodity from cold storage to the consumer, the maintenance of cooling is interrupted and the temperature of the commodity is returned to temperature of outside air, the surfaces of the vegetables and the like get wet due to dew collecting thereon, whereby the product quality deteriorates rapidly.

In the method (2) of suppressing respiration by lowering the partial pressure of oxygen in the atmosphere surrounding the commodity, the property of plants such as vegetables whereby their quantity of respiration varies with the partial pressure of oxygen in the surrounding atmosphere, becomes pregressively small as the partial pressure of oxygen in the air becomes lower than 0.2 atmospheres, and decreases rapidly when this partial pressure becomes less than 0.05 to 0.1 atmospheres. For example, the so-called CA (controlled atmosphere) storage method, wherein a few percent to 20 percent of carbon dioxide gas is admixed into the air in the storage chamber of warehouse to lower the partial pressure of oxygen with the aim of long-period preservation, is regarded as a very good storage method. However, similarly as in the above described low-temperature storage method, this CA storage method entails high cost for equipment and operation, and, furthermore, the beneficial effect of the preservation is lost by the return to the ordinary atmosphere in the distribution process subsequent to shipment from the storage warehouse.

In the method (3) of suppressing respiration and preventing moisture evaporation by packaging in a film envelope, vegetables and the like are stored in envelopes made of thin films of resins such as polyvinyl chloride, polyethylene, and polypropylene. This method is initially effective in preservation in that, within the small, limited system in each envelope, the partial pressure of oxygen is lowered by the carbon dioxide gas exhaled by the contents of the envelope. However, the carbon dioxide gas thus discharged progressively accumulates in the envelope to cause so-called accumulative injury or damage, and, at a certain time, a sudden lowering of the product quality or decaying occurs. Of course, selection of the thickness and material of the envelope film or the supplementary measure of aiding the flow of air by mechanically forming small holes therein has been resorted to overcome the disadvantage, but as the degree of ripening of the vegetable or the like contained in the envelope progresses, fluctuations in the required oxygen quantity, the discharged carbon dioxide gas quantity, and, further, the quantity of moisture evaporated off occur, and it is extremely difficult to exercise fine control simultaneously over all of these conditions.

The method (4) of suppressing respiration and preventing moisture evaporation by surface coating has the following features. Ordinarily, a higher plant grown on land inhales oxygen necessary for cellular respiration from the outside and discharges carbon dioxide gas to the outside, the flowing in and discharging of gases necessary for respiration being accomplished through the epidermal cells having stigmas and lenticels. Therefore, by decreasing the cross-sectional areas of these stigmas and lenticels, the quantity of oxygen inhaled into the plant structure can be restricted without changing the partial pressure of the oxygen in the outside air, and, as a result, the quantity of respiration is reduced. Accordingly, as methods of utilizing this phenomenon for preservation, a large number of processes for coating films by some measure on the surfaces of vegetables and the like have been proposed. Examples of these proposals are those set forth in the specifications of Japanese Pat. Publication Nos. 32344/1973, 946/1973, 18467/1973, 5030/1973, and 10683/1960 and U.S. Pat. Nos. 2,700,025, 2,755,189, 2,872,325, 3,410,696, 2,961,322, and 2,346,755.

These processes proposed heretofore, generally comprise forming a film of hydrophobic wax or resin on the surface of the vegetables or like in order to prevent lowering of the degree of freshness thereof due to evaporation of water content or comprise forming a film of any of various synthetic resins on the surfaces of the vegetables or the like for the purpose of controllably suppressing passage of gases, by utilizing the differences in gas permeability due to the molecular structures of the synthetic resins.

However, for accomplishing fine control of physiological functions in accordance with each and every kind of vegetable or the like by these proposed processes, ample preservation effect would not be attained with films of uniformly standardized materials. For example, in the case where a film of very low gas permeability is formed to coat a vegetable or the like of relatively intense respiration action, and the minimum quantity of oxygen required for respiration cannot be inhaled in, the vegetable or the like undergoes anaerobic respiration, that is, respiration between molecules, and as a metabolic product, alcohol is produced instead of carbon dioxide gas and water. As a result, an abnormal odor impairing the taste of the vegetable or the like as food is generated, and the object of preservation would not be achieved. On the other hand, in the opposite case wherein a film of relatively high gas permeability is formed as a film to coat a vegetable or the like of small respiration quantity, gas necessary for respiration freely flows in, and the effect of preservation due to the film is not exhibited.

On one hand, an egg, which is herein regarded as one of agricultural products, comprises a blastodisc or embryo, egg white or albumen, egg yolk and an eggshell. The eggshell has numerous micropores, through which moisture and carbon dioxide gas are discharged to the outside during storage, and, at the same time, microorganisms infect into the egg from the outside through these micropores. The evaporation of moisture from an egg is principally the evaporation of the water in the albumen to the outside, and this gives rise to a decrease in the weight of the egg, an expansion of the air shell, and a lowering of the product quality. Furthermore, when the carbon dioxide gas dissolved in the albumen penetrates to the outside, the pH rises, and it becomes impossible to prevent the propagation in the egg of the microorganisms which have infected thereinto from the outside. Consequently, the preservability of the egg decreases remarkably.

The principles of long-period preservation of eggs of fowl such as chickens and quails, which eggs after being laid are used especially for food, are substantially the same as those in the case of vegetables and the like, the important measures based on these principles being (1) suppression of exhalation of carbon dioxide gas to the outside, (2) prevention of evaporation of moisture and (3) prevention of infection and propagation of microorganisms.

Examples of preservation methods based on these principles and heretofore proposed are (1) prevention of infection and propagation of microorganisms by low-temperature storage and (2) suppression of exhalation of carbon dioxide gas to the outside, prevention of evaporation of moisture, and prevention of infection of microorganisms by surface coating.

The former method (1) comprises conveying laid eggs to an egg storage chamber at low temperature, carrying out processes such as inspecting, washing, and classification of the eggs, packaging the eggs in boxes, transporting the eggs thus packaged to consumption areas by refrigerated trucks, vans or lorries, and carrying the eggs to refrigerated show cases of retail stores. In an imperfect distribution system, as those existing at present, however, water vapor in the atmosphere condensed on the eggshells when the eggs contact the outside air during distribution, and, as a consequence, the eggs assume a state resembling perspiration or sweating. The net result, contrary to expectation, is that the preservability is lowered. Furthermore, this method tends to be excessively expensive and is difficult to implement under the present circumstances.

The latter method (2) comprises coating the surfaces of eggs with a film to preserve the eggs by utilizing the properties of the film. For this purpose, a number of processes have been proposed, examples of which are those disclosed in Japanese Pat. Publication Nos. 5027/1957, 6226/1969, and 20150/1968. These known processes are characterized by the forming on the egg surface of a film of a hydrophobic material such as wax or paraffin for the purpose of preventing lowering of the freshness of the egg due to evaporation of water or by the forming on the egg surface of a film of any of various synthetic resins for the purpose of controllably suppressing the passage of gases, the differences in gas permeabilities due to the molecular structures of these synthetic resins being utilized. By these processes, however, control of the discharge of the carbon dioxide gas of the egg to the outside, the evaporation of water, and prevention of infection and propagation of microorganisms would not be accomplished simultaneously and efficiently. This problem is substantially the same as that described with respect to vegetables and the like.

SUMMARY OF THE INVENTION

It is an object of this invention to provide a process for coating the surfaces of agricultural products for the purpose of controlling simultaneously and comprehensively the quantity of oxygen required for respiration, the quantity of discharged carbon dioxide gas, and the quantity of evaporation of water content at the time of storage of the agricultural products, in accordance with the respective characters thereof to maintain the agricultural products in a state of high degree of preservation over a long period of time; a coating composition suitable for use in this process; and agricultural products thus coated.

Another object of the invention is to provide agricultural products which are subject to no lowering of their degree of freshness in their distribution route from their preservation processing, through their reception by the consumers, to their use in cooking; a process for processing these agricultural products; and a coating composition suitable for use in this process.

Still another object of the invention is to provide an economical process for preserving agricultural products which does not require any preserving equipment, management cost, maintenance cost, and other expenses; a coating composition suitable for use in this process; and preservation processed agricultural products thus obtained.

In accordance with this invention in one aspect thereof, briefly summarized, there is provided a coating composition for preservation processing of agricultural products comprising a dispersion prepared by blending and dispersing in a certain specific proportion in an aqueous solution of a water-soluble high polymer a hydrophobic substance selected from the group consisting of hydrophobic solids and hydrophobic and non-volatile liquids of low affinity for this water-soluble high polymer, that is, an aqueous emulsion or an aqueous suspension.

In accordance with this invention in another aspect thereof, there is provided process for preservation processing of agricultural products which comprises coating the surfaces of agricultural products with the above described coating composition and drying thereof to form protective membranes on the surfaces of agricultural products.

In accordance with this invention in a further aspect thereof, there are provided agricultural products preservation processed by the above described process.

The coating composition thus applied on the surfaces of the agricultural products dries to form a coating membrane which comprises microparticles of the hydrophobic substance dispersed in a matrix of the membrane of the water-soluble high polymer which has been in the aqueous solution, fine continuous microvoids being formed between the fine particles of dispersoid or the microparticles and the matrix. The agricultural products thus coated can be preserved in fresh state over a long period because their respiration quantity is controllably suppressed by these fine continuous microvoids in the membrane.

The term "water-soluble high polymer" is herein used to designate a natural or synthetic high polymer having a hydrophilic group such as hydroxyl group, carboxyl group, or amino group and, upon being dissolved in water, undergoing hydration through the above mentioned hydrophilic group to become a colloidal aqueous solution or assuming a gel state.

The term "hydrophobic substance" is herein used to designate a material which is substantially insoluble in water and in which water is substantially insoluble. The material can be solid or substantially non-volatile liquid.

The nature, principles, and utility of this invention will be more clearly apparent from the following detailed description beginning with a consideration of general features of the invention and concluding with specific examples of practice illustrating preferred embodiments of the invention.

DETAILED DESCRIPTION

Figure 1:
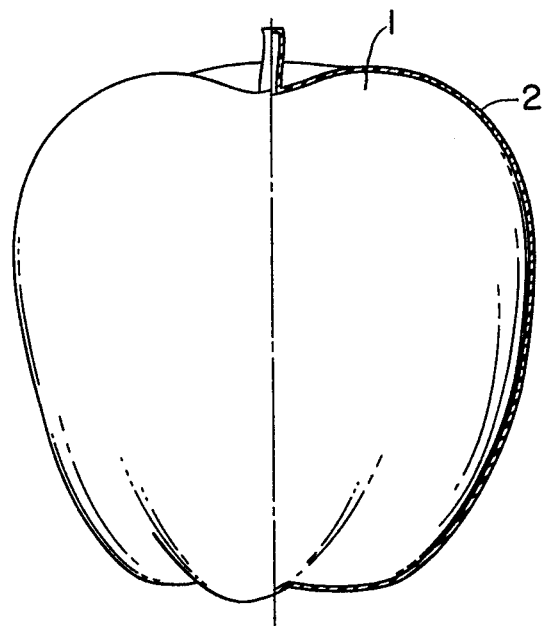
FIG. 1 is perspective view of an apple which has been preservation processed in accordance with the invention, the left half showing the exterior thereof and the right half showing the state wherein the coating membrane for preservation has been peeled off and, moreover, showing the membrane in section.

The coating composition of this invention and the membrane formed thereby on the surface of an agricultural product will first be described with reference to the drawing.

Referring to FIG. 1, the agricultural product 1, which is an apple in this example, and which has been preservation processed in accordance with this invention, has thereon a coating membrane 2 formed by applying the dispersion of this invention as a coating thereon and drying the same.

When a coating composition comprising an aqueous solution of a water-soluble high polymer and fine particles of a hydrophobic solid or a hydrophobic and non-volatile liquid of low affinity for this water-soluble high polymer uniformly mixed and dispersed in the aqueous solution is applied as a coating layer and dried on the outer surface of an agricultural product 1, the water which is the solvent of the solution of the water-soluble high polymer and, at the same time, is the dispersion medium, as the solution, for the hydrophobic substances progressively evaporates, and the fine particles of the dispersoid gradually approach one another and begin to form a membrane.

In this case, since the outer surface of these fine particles or microparticles are surrounded by the solution of the water-soluble high polymer of low affinity for these particles, these particles themselves do not "sinter" nor cohere into a continuous film as in the case, for example, of the rubber particles of rubber latex, but are in a discrete state wherein the solution of water-soluble high polymer in concentrated state is interposed between these particles.

Figure 2:
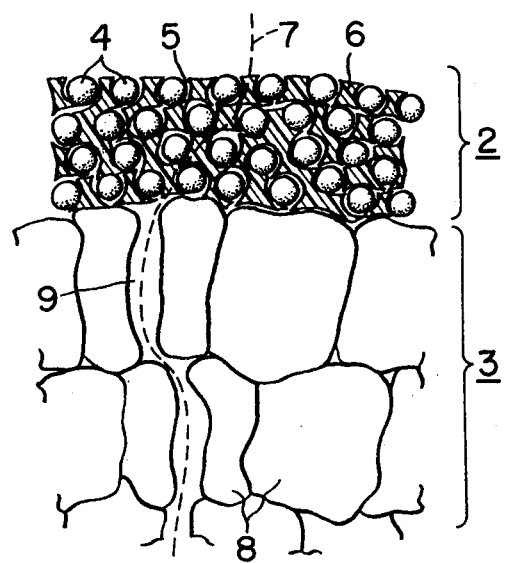
FIG. 2 is a fragmentary, enlarged, diagrammatic view in section taken along a plane perpendicular to the membrane for preservation on the apple shown in FIG. 1 and showing a region in the vicinity of the apple epidermis.

Now, reference is made to FIG. 2. The microstructure of the coating membrane for preservation formed in this manner is shown together with the microstructure of the epidermis of an apple in FIG. 2, in which the coating membrane formed after drying is designated by reference numeral 2, and reference numeral 3 designates one portion of the epidermis cell layer of the apple 1 (FIG. 1).

About the time when most of the water content has evaporated off, these microparticles lose their fluidity. This structural state is analogous to that of a wall formed by stacked stones and having voids filled with water. With the lapse of time as the coating layer exists in this state, the solution of the water-soluble high polymer finally becomes fully dry to form a continuous membrane 2. However, since the dispersoid microparticles 4 are surrounded by matrix of the water-soluble high polymer 6, the evaporation off of the water content and drying gives rise to a "shrinkage" of the solution of water-soluble high polymer due to reduction of the volume of the solution of water-soluble high polymer, whereby extremely minute and, moreover, continuous or intercommunicative voids 5 are produced between the matrix of the water-soluble high polymer 6 and the microparticles 4.

These voids 5 are mutually intercommunicative or continuous and form tortuous passageways 7 for passage of gases between the side of the membrane contacting the apple epidermis 3 and the side contacting the outer atmospheric air. Since these voids 5 are dispersed three-dimensionally and are mutually intercommunicative throughout the coating membrane 2, the passageways for passage of gases formed by the intercommunication of these voids also exist three-dimensionally in this coating membrane, and, moreover, there is a great possibility of mutual intercommunication between these passageways. Therefore, it may be said that this group of passageways form a three-dimensional (i.e., are curved also in the direction perpendicular to the plane of the drawing) labyrinth.

On one hand, the epidermis 3 of the apple in contact with this coating membrane comprises a large number of cells 8 and stigmas 9 between the cells. The effective diameters and the distribution density of the passageways 7 for passage of gases existing in the coating membrane 2 are respectively amply smaller than and larger than the diameters and distribution density of the stigmas in the apple epidermis 3. Therefore, the desired degree of gas permeability can be positively maintained even when the passageway 7 for gas passage and the stigmas 9 respectively have random distributions.

Even if the dispersoid is in the form of minute liquid oil droplets at room temperature at this time, since this dispersoid is enveloped in a thin wall of the water-soluble high polymer, the oil droplets will not cohere into a continuous oil film even after the water content has completely evaporated off, but individual oil particles will retain their particulate shape.

It has been found that, if, in the practice of this invention, the quantity of the water-soluble high polymer is excessive relative to the quantity of microparticles of dispersoid, these particles will be fully surrounded by the matrix of the water-soluble high polymer and will be in an excessively discrete state, whereby continuous microvoids cannot be formed between the particles and the matrix of water-soluble high polymer. On the other hand, if the quantity of the water-soluble high polymer is too small, the formability of the continuous membrane becomes poor. In order to produce continuous microvoids in this case, the ratio of the volume of the dispersoid and the volume of the high polymer substance should be in the range of 10:1 to 10:5. At this time, the size of continuous microvoids decreases with decrease in the grain size of the dispersoid particles and, furthermore, as the ratio of the volumes of the dispersoid and the water-soluble high polymer approaches the minimum limit for formation of microvoids.

Through these microvoids, oxygen required for respiration action of minimum limit within which the agricultural product will not be subject to physiological damage is supplied, and, at the same time, waste gases and moisture are discharged to the outside, whereby maximum preservation effect is exhibited. For this purpose, the particle size of the dispersoid or, in other words, the particle size of the hydrophobic substance should be in the range of from 0.1 to 10 microns, preferably from 1 to 8 microns. For causing the particle size of the dispersoid to fall in a desired range, any measure adoptable for control of the particle size of the dispersoid in aqueous emulsions or aqueous suspensions can be resorted to.

More specifically, examples of such measures are: the use of an emulsifier or a suspension stabilizer; the selection of an appropriate concentration or viscosity of the dispersion medium, i.e., the aqueous solution of the water-soluble high polymer; the selection of an appropriate weight ratio of (water-soluble high polymer to be used)/(hydrophobic substance to be used); the adjustment of the rotational speed and time period of agitation; the selection of an appropriate difference between the solubility parameters of the water-soluble high polymer and the hydrophobic substance; and the use of a hydrophobic substance of desired particle size in the case where the substance is a solid.

As an emulsifier, a sucrose fatty acid ester, lecithin, or an alkali salt (Na or K salt) of oleic acid is used in a quantity of from 0.2 to 10 percent relative to the hydrophobic substance to be dispersed.

In order to obtain the dispersion, the emulsifier is first dissolved in the required quantity of warm water, and the hydrophobic substance to be dispersed is heated in the case where it is a solid at room temperature to a temperature above its melting point into liquid and is poured into the warm water, as it is agitated at a rotational speed of from 1,000 to 6,000 rpm., the agitation being continued until a desired particle size is obtained.

In this process, the water-soluble high polymer may be dissolved beforehand in the warm water, and the hydrophobic substance dispersed thereinto. Alternatively, the water-soluble high polymer may be added to and dissolved in the previously prepared aqueous emulsion or suspension of the hydrophobic substance. When used for the coating process, the coating composition or the dispersion is of the order of from 3 to 50 cps in terms of viscosity, and the content of the hydrophobic substance is of the order of from 3 to 20 percent by weight, preferably from 5 to 15 percent by weight. Higher viscosity or concentration is of course feasible and is preferable to reduce the volume of the coating composition or the dispersion.

The coating composition or the dispersion can be applied onto an agricultural product by any method which is commonly used or is usable for applying liquid coating material. Examples of specific method are spray coating, flow coating, and brush coating of the dispersion onto the agricultural product; and immersing the agricultural product in a bath of the dispersion. The drying after coating can be carried out by any suitable drying method at room temperature and atmospheric pressure or with slight heating and/or under reduced pressure.

After drying the thickness of the resulting membrane is of the order of from 3 to 100 microns, particularly from 3 to 20 microns. The water vapor permeability and the oxygen permeability of this membrane are respectively of the order of from 20 to 600 grams/-square meter/24 hour (g./m$^2$./24hr.)/atm. (20° C dry) and from 35 to 1,200 g./m$^2$./24hr./atm (20° C dry).

Materials suitable for use in the practice of this invention are as follows. Examples of suitable materials for the water-soluble high polymer are: pentosans (e.g., acacia or gum arabic); hexosans (e.g., starches, fructosans, and mannosans); polysaccharides such as conjugated polysaccharides (e.g., gums); proteins such as casein, gelatin, and soybean protein; cellulose derivatives such as methylcellulose and carboxy-methylcellulose (preferably sodium salt); seaweed mucilages such as alginate (preferably sodium salt) (e.g., agar-agar), and polyvinyl alcohols. The solubility parameters of these materials are from 13 to 21. For example, the solubility parameters of acacia and casein, which are used most often in the Examples of this invention, are 17.2 and 15.4 respectively. Since the solubility parameters of these high polymers are close to that of water, 21, they are water soluble in all cases.

Examples of the hydrophobic substance are natural waxes such as beeswax and carnauba wax, vegetable oils such as soybean oil and coconut oil, and hardened oil resulting from hydrogenation of such vegetable oils and mineral oils such as paraffin and microcrystalline paraffin. The solubility parameters of these materials are from 5 to 10, which are far from that of water. Therefore, each of these materials is not water soluble and is thus hydrophobic. The difference between the solubility parameters of the water-soluble high polymer and hydrophobic substance used is ordinarily of the order of from 3 to 15, particularly from 5 to 13.

The above listed water-soluble high polymers and hydrophobic substances, exclusive of mineral oils, have no deleterious effect on the human body and are authorized by the Ministry of Health and Welfare of the Japanese Government as being edible or usable for food additives. Accordingly, these substances do not create any problems whatsoever of hygiene or sanitation when they are brought into contact with the outer surfaces of vegetables and the like.

It is possible that, among the mineral oils, there are some which can impart harmful effects to the human body if incepted thereinto in large quantity. However, as described hereinbefore, the microparticles of the hydrophobic substances are completely surrounded by the dispersion medium in the formation of the membrane, whereby there is no possibility of a mineral oil of the dispersoid penetrating through the epidermis of the vegetable or the like into the interior thereof, and, in the case where the product is to be used after peeling, as, for example, in the case of fruits for canning, these mineral oils can be used with ample margin of safety.

In addition to the selection of the mixing ratio of the water-soluble high polymer and the hydrophobic substance in the control of the quantity of respiration, i.e., the quantity of permeation of oxygen, measures such as adjusting the membrane thickness by appropriately selecting the content of the hydrophobic substance and controlling the adhering quantity by regulating the viscosity of the dispersion can be carried out, but it is advantageous in actual practice to verify beforehand the blending ratios which will permit the formation of a membrane of the desired porosity and, moreover, will result in maximum rate of drying.

In comparison with the prior techniques of preservation of agricultural products, the present invention has numerous advantageous features of utility, the most important of which are set forth below.

1. A first feature of utility will be described through a comparison with the "pretreatment" generally practiced for fruits and vegetables. This "pretreatment" is a method to suppress respiration and to suppress evaporation of water content by utilizing the physiological characteristics of the products. Immediately after harvesting, the fruits and vegetables are exposed in a cool place with good ventilation for a period of several hours to several days thereby to promote drying of the epidermis, for the stigmas and lenticels to contract, and thereby to suppress respiration and evaporation of water. However, a problem accompanying this "pretreatment" is that, as the humidity of the surrounding air rises, the stigmas and lenticels again expand or give rise to the so-called "reswelling of peel" phenomenon, whereby the effect of preservation is lost.

In contrast, the process for preservation of agricultural product according to this invention comprises physically forming a membrane having fine continuous microvoids on the epidermis of fruits and vegetables. These microvoids of the membrane formed on the agricultural product thus preservation processed undergo no deformation even when the humidity of the surrounding air varies, and the preservation effect can be continued constantly.

2. The second feature of utility is that, since the quantity of oxygen required for respiration, the quantity of discharged carbon dioxide gas, and the quantity of evaporated water at the time of storage of an agricultural product can be controllably suppressed precisely, simultaneously, and, moreover in a comprehensive manner in accordance with the physiological functions of the agricultural product through the action of the fine continuous microvoids, a state of product preservation of very high degree in comparison with that resulting from conventional methods, in which these quantities are suppressed separately, can be continuously maintained over a long period.

3. A third feature of utility is that, since the membrane of this invention having fine continuous microvoids is formed as a coating directly on the outer surface of an agricultural product, the agricultural product thus processed according to this invention is not subjected to an interruption of its state of preservation during its distribution operation as in the known low-temperature storage method or the CA storage method, and there is no loss whatsoever of the preservation effect until the consumer begins to prepare the product for use.

4. A fourth feature of utility is that, since preservation is fully effected merely by forming a membrane having fine continuous microvoids as a coating on the outer surface of an agricultural product, there is no need whatsoever for facilities such as storage warehouses or chambers for preservation, whereby management and maintenance costs thereof are eliminated, and, furthermore, the coating process can be carried out by a very simple procedure such as spray and immersion, whereby the process does not require much labor and is economical.

While the composition for preservation processing of agricultural products according to this invention is ordinarily placed on the market in a state wherein it can be used immediately, it can be placed on the market in a concentrated form to be subsequently diluted for use by the user or in the form of a kit comprising in combination, an aqueous solution of the water-soluble high polymer material and an aqueous dispersion (particularly an emulsion) of the hydrophobic substance to be subsequently mixed for use by the user. Such methods of marketing are particularly advantageous and effective for long-period preservation of the composition for preservation processing.

In order to indicate more fully the nature and utility of this invention, the following specific examples of practice constituting preferred embodiments of the invention are set forth, it being understood that these examples are presented as illustrative only and that they are not intended to limit the scope of the invention.

EXAMPLE 1

The following materials were used in the quantities specified and in the manner described below.

|  | Parts by weight |
|---|---|
| hydrogenated coconut oil | 15 |
| casein | 2 |
| sodium oleate | 0.75 |
| (or sucrose fatty acid ($C_{16}$–$C_{18}$) ester | 1.5) |
| water | 100 |

The sodium oleate or sucrose fatty acid ester, which is an emulsifier, was dissolved in the water, and, as the resulting solution was heated at 60° C, casein was dissolved therein. Then, as the resulting solution was stirred by an agitator operated at 6,000 rpm., hydrogenated coconut oil heated and melted at 60° C was poured thereinto to prepare a uniform suspension. The particle size of the particles in the suspension thus prepared was 1 micron with both emulsifiers.

In this suspension, "Unshū" mandarin oranges or tangerines (Citrus unshū) were immersed for 1 to 2 seconds and dried in an air stream to form a membrane on the outer surface thereof. These "Unshū" oranges were stored at room temperature for 60 days and compared with similar "Unshū" oranges without surface treatment stored under the same conditions as reference or control. The results were as follows:

|  | Citric acid (%) | Brix (%) | Weight loss (%) |
|---|---|---|---|
| Oranges according to this invention | 1.02 (1.23) | 11.2 (9.6) | 10.9 |
| Control oranges | 0.80 (1.23) | 8.8 (9.6) | 20.3 |

Note:
values in parentheses ( ) are those at the start of the test.

As is apparent from the above results, the oranges processed in accordance with this invention underwent less variation in citric acid content, brix, and weight than the control oranges and, therefore, exhibited better results.

The instant test was started with oranges of a uniform degree of ripeness of 50 percent. The oranges processed according to this invention exhibited a residual green color of the order of 20 percent, no wilting, and good exterior appearance, while all of the control oranges exhibited an over-ripe state with extreme wilting and had no value as a marketable commodity.

Sucrose fatty acid esters are prescribed as edible emulsifiers by the law about foods and drugs in Japan. However, since even purified emulsifiers can be contaminated with some residues of materials used in their manufacture such as catalysts and solvents, any effects of such residues to the human body when incepted thereinto should be fully considered when a particular emulsifier is to be selected to use. In Japan sucrose fatty acid esters are permitted to use for food industry when no dimethylformamide used as a solvent in manufacture thereof is detected; and in the United States of America and in a member of European Economic Community (EEC) sucrose fatty acid esters have not been prescribed as additives for foods and cannot be used as an emulsifier in practice of the present invention in these countries.

Sodium oleate is permitted to use in Japan as a coating agent only for fruits and fruits-like vegetables having an epidermis such as tomato.

Accordingly, the emulsifier in the present invention should be so selected and used as to be subject to the laws and ordinances about foods and drugs in the particular country in which the present invention is to be practiced.

Sucrose fatty acid esters are less effective as an emulsifier than sodium oleate, and should thus be used in larger quantity as compared with the case of sodium oleate. For some kinds of mandarin oranges or apples, oils or fats contained therein can bleed on their epidermis, and the membrane produced from a coating dispersion in which a sucrose fatty acid is used, in accordance with the present invention cannot be satisfactorily formed in some cases.

The above description about the selection of emulsifier holds also in Examples 2 to 11.

EXAMPLE 2

The following materials were used in the quantities specified and in the manner described below.

|  | Parts by weight |
|---|---|
| coconut oil (SP* : 9.8) | 15 |
| starch (SP : 19.70) | 1.5 |
| sodium oleate | 1.2 |
| (or sucrose fatty acid ester | 1.5) |
| water | 100 |

*Solubility Parameter

By the procedure specified in Example 1, an emulsion of the coconut oil was prepared. The grain size of the particles in the finished emulsion was 0.7 microns with both emulsifiers.

"Saya-endo", pod legumes similar to field peas (Pisum arvense), were immersed for 1 to 2 seconds in this emulsion, and the emulsion coating was dried in a stream of air thereby to form a coating membrane on the outer surfaces of the peas. These peas thus coated were stored at room temperature and their weight loss (%) and external appearance were compared with those of peas without surface treatment stored under the same conditions as reference control, whereupon the following results were obtained.

|  | Weight loss (%) | |
|---|---|---|
| After | "Saya-endo" of invention | Control "saya-endo" |
| 1st. day | 9.1 | 16.0 |
| 2nd. day | 12.6 | 32.6 |
| 3rd. day | 18.6 | 49.6 |
| 4th. day | 24.8 | 62.0 |
| 6th. day | 36.0 | 75.0 |
| 8th. day | 47.3 | 81.5 |

As is apparent from the above results, the loss in weight of the "saya-endo" peas processed according to this invention was less than that of the control peas. Furthermore, the peas processed according to the invention exhibited only some wilting after 8 days, but considerable wilting was observed in the control peas after 3 days.

EXAMPLE 3

The following recipe was used to prepare a suspension of beeswax by the procedure set forth in Example 1.

|  | Parts by weight |
|---|---|
| beeswax (SP : 8.0) | 10 |
| casein (SP : 15.4) | 2 |
| sodium oleate | 0.5 |
| (or sucrose fatty acid ester | 1) |
| water | 100 |

The grain size of the particles in the suspension thus prepared was 3 microns with both emulsifiers.

In this suspension, apples were immersed for 1 to 2 seconds and were then dried in a stream of air form a membrane covering the outer surfaces of the apples. These apples were then stored at room temperature for 142 days and compared with control apples without surface processing but stored under the same conditions with respect to malic acid content, brix, and loss in weight. The results were as follows.

|  | Malic acid (%) | Brix (%) | Weight loss (%) |
|---|---|---|---|
| Apples according to the invention | 0.34 (0.36) | 11.7 (11.9) | 8.0 |
| Control apples | 0.28 (0.36) | 10.1 (11.9) | 19.2 |

Note:
Values within parentheses ( ) are those at start of test.

As is indicated by the above results, the apples processed in accordance with this invention exhibited better results than the control apples with respect to malic acid content, brix, and weight loss. Furthermore, the apples processed according to the invention did not show any change in both sarcocarp hardness and lustre during storage, but, in contrast, the control apples exhibited severe wilting and great change in lustre.

EXAMPLE 4

A soybean oil emulsion was prepared by the procedure specified in Example 1 with the following recipe.

|  | Parts by weight |
|---|---|
| soy bean oil (SP : 9.8) | 10 |
| carboxymethylcellulose, Na (SP: 21.05) | 0.5 |
| sodium oleate | 0.8 |
| (or sucrose fatty acid ester | 1) |
| water | 100 |

The grain size of the particles in the emulsion thus prepared was 5 microns with both emulsifiers.

In this emulsion, "sora-mame", flat broad beans similar to lima beans, were immersed for 1 to 2 seconds and were then dried in a stream of air to form a membrane covering the outer surface of each bean. These beans thus processed were then stored at room temperature, and their weight loss (%) and external appearance were compared with those of control beams without surface processing but stored under the same conditions. The results were as follows.

| After | Weight loss (%) Beans of the invention | Control beans |
|---|---|---|
| 1st. day | 2.9 | 6.3 |
| 2nd. day | 6.1 | 13.0 |
| 3rd. day | 10.1 | 20.1 |
| 4th. day | 15.7 | 28.1 |
| 6th. day | 24.8 | 45.5 |
| 8th. day | 28.0 | 57.2 |

As indicated by the above results, the beans processed according to the invention exhibited better results in weight loss than the control beans. Furthermore, while the beans processed according to the invention wilted after 6 days and were observed to have blackened somewhat after 8 days, the control beans had already wilted after 3 days and blackened after 4 days.

EXAMPLE 5

A suspension of beeswax was prepared by the procedure set forth in Example 1 with the following recipe.

|  | Parts by weight |
|---|---|
| beeswax | 10 |
| acacia (gum arabic) (SP : 17.2) | 2 |
| sodium oleate | 0.8 |
| (or sucrose fatty acid ester | 1) |
| water | 100 |

The grain size of the particles in the suspension thus prepared was 8 microns with both emulsifiers.

In this suspension, tomatoes of a maturity degree of the order of 20 percent were immersed for 1 to 2 seconds and were then dried in a stream of air to form a membrane covering the outer surface of each tomato. These tomatoes thus processed were then stored at room temperature, and their weight loss (%) and external appearance were compared with those of control tomatoes without surface processing but stored under the same conditions. The results were as follows.

| After | Weight loss (%) Tomatoes of the invention | Control tomatoes |
|---|---|---|
| 1st. day | 0.89 | 0.91 |
| 2nd. day | 1.28 | 1.69 |
| 3rd. day | 1.87 | 2.57 |
| 4th. day | 2.56 | 3.22 |
| 5th. day | 3.58 | 4.44 |

As indicated by the above results, the tomatoes processed according to the invention exhibited better results in weight loss than the control tomatoes. Furthermore, the degree of after-ripening, that is, acquiring of color, during storage of the tomatoes processed according to the invention was from 3 to 5 days slower than that of the control tomatoes, and the distribution time, i.e., marketing or saleable time, could be prolonged by the number of days thus extended.

EXAMPLE 6

An emulsion was prepared by the procedure specified in Example 1 with the coconut oil and aqueous solution of sodium alginate of the following recipe used as the dispersoid and the dispersion medium, respectively.

|  | Parts by weight |
|---|---|
| coconut oil | 10 |
| sodium alginate (SP : 21.84) | 0.2 |
| sodium oleate | 0.8 |
| (or sucross fatty acid ester | 1) |
| water | 100 |

The grain size of the particles in the emulsion thus prepared was 0.3 micron with both emulsifiers.

In this emulsion, "nashi" or Japanese pears (P. serotina var. culta) were immersed for 1 to 2 seconds and were then dried in a stream of air to form a membrane covering the outer surface of each pear. These pears thus processed were then stored at room temperature, and their weight loss (%) and external appearance were compared with those of control pears without surface processing but stored under the same conditions, whereupon the following results were obtained.

| After | Weight loss (%) | |
| --- | --- | --- |
| | Pears of the invention | Control pears |
| 10 days | 6.27 | 9.73 |
| 21 days | 11.27 | 17.21 |

As indicated by these results, the pears processed according to the invention exhibited better results in weight loss than the control pears. Furthermore, after 21 days of storage, the pears processed according to the invention exhibited no decrease of lustre and showed no wilting or shrivelling, whereas the control pears exhibited loss of lustre and wilting or shrivelling.

EXAMPLE 7

An emulsion was prepared by the procedure specified in Example 1 with a mixture of the coconut oil and beeswax of the following recipe.

| | Parts by weight |
| --- | --- |
| coconut oil | 5 |
| beeswax | 5 |
| sodium oleate | 0.8 |
| (or sucrose fatty acid ester | 1) |
| "konnyaku"* mannan | 2 |
| water | 100 |

*devil's tongue jelly

The grain size of the particles in the emulsion thus prepared was 4 microns with both emulsifiers.

In this emulsion, "hakuto" or peaches were immersed for 1 to 2 seconds and then dried in a stream of air to form a membrane covering the outer surface of each peach. These peaches thus processed were stored at room temperature, and their weight loss (%) and external appearance were compared with those of control peaches without surface processing but stored under the same conditions, whereupon the following results were obtained.

| After | Weight loss (%) | |
| --- | --- | --- |
| | Peaches of the invention | Control peaches |
| 2 days | 2.85 | 4.21 |
| 5 days | 5.00 | 6.55 |
| 10 days | 6.99 | 11.32 |

As indicated by these results, the peaches processed according to the invention exhibited better results in weight loss than the control peaches. Furthermore, no variation in the sarcocarp and no loss of lustre, whatsoever, were observable in the peaches processed according to the invention, whereas the control peaches showed a beginning of browning, coarsening of the sarcocarp and some loss of lustre.

EXAMPLE 8

An emulsion of coconut oil was prepared by the procedure specified in Example 1 with the following recipe.

| | Parts by weight |
| --- | --- |
| coconut oil | 10 |
| casein | 2 |
| sodium oleate | 0.5 |
| (or sucrose fatty acid ester | 1.5) |
| water | 100 |

The grain size of the particles in the emulsion thus prepared was 2 microns with both emulsifiers.

In this emulsion, chicken eggs were immersed for 1 to 2 seconds and were then dried in a stream of air to form a membrane covering the outer surface of each egg. These eggs thus processed were stored at room temperature for 35 days, during which their specific gravity, pH value, yolk index, and albumen index and weight loss % at different times were compared with those of unprocessed control chicken eggs. The results obtained were as follows.

| | Eggs of the invention | Control eggs |
| --- | --- | --- |
| Specific gravity | | |
| Start of test | 1.083 | 1.083 |
| After 20 days | 1.077 | 1.055 |
| After 35 days | 1.073 | 1.032 |
| pH value | | |
| Start of test | 9.0 | 9.0 |
| After 20 days | 8.6 | 9.0 |
| After 35 days | 8.3 | 8.9 |
| Yolk index | | |
| Start of test | 0.39 | 0.39 |
| After 20 days | 0.29 | 0.14 |
| After 35 days | 0.26 | 0.10 |
| Albumen index | | |
| Start of test | 0.04 | 0.04 |
| After 20 days | 0.04 | ≈ 0 |
| After 30 days | 0.03 | ≈ 0 |
| Weight loss | | |
| After 20 days | 1.6 | 2.6 |
| After 30 days | 2.0 | 3.5 |
| After 40 days | 2.5 | 4.7 |
| After 50 days | 3.6 | 5.7 |
| After 60 days | 3.7 | 6.7 |

The yolk index of each egg was determined by pouring the contents of the egg onto a flat plate, measuring the height and diameter of the yolk as the albumen and yolk are without being separated, and dividing the yolk height by its diameter. The albumen index is similarly determined by pouring the contents of the egg onto a flat plate and dividing the measured albumen height by its diameter.

From the above results, it is apparent the process of the invention is highly effective in preserving eggs in a better state in all respects than unprocessed eggs.

EXAMPLE 9

A suspension of beeswax was prepared by the procedure specified in Example 1 with the following recipe.

| | Parts by weight |
| --- | --- |
| beeswax | 10 |
| gelatine | 3 |
| sodium oleate | 0.5 |
| (or sucrose fatty acid ester | 1) |
| water | 100 |

The grain size of the particles in the suspension thus prepared was 1 microns with both emulsifiers.

In this suspension, ears of Indian corn (maize) immediately after harvesting, and in their as harvested state without husking, were immersed over ⅔ of their overall lengths from their stem ends for 1 to 2 seconds and were then dried in a stream of air to form a membrane covering the surfaces thus immersed. These ears of corn were stored at room temperature, and their brix and weight loss at different times were compared with those of unprocessed control ears of corn, whereupon the following results were obtained.

|  | Brix (%) | |
| --- | --- | --- |
|  | Corn of this invention | Control corn |
| Immediately after harvesting | 18.0 | 18.0 |
| After 1 day | 17.2 | 12.8 |
| After 4 days | 11.0 | 3.6 |
| After 5 days | 8.6 | 3.2 |

|  | Weight loss (%) | |
| --- | --- | --- |
|  | Corn of this invention | Control corn |
| After 1 day | 3.6 | 5.8 |
| After 2 days | 7.2 | 9.6 |
| After 3 days | 12.5 | 15.7 |
| After 4 days | 14.0 | 19.6 |
| After 5 days | 17.8 | 24.2 |

The above results indicate that the corn processed according to this invention underwent less variation in brix and weight loss than the control corn and that the effect of preservation of the process is good.

EXAMPLE 10

The following recipe was used to prepare a suspension of carnauba wax by the procedure set forth in Example 1.

|  | Parts by weight |
| --- | --- |
| carnauba wax | 10 |
| polyvinyl alcohol | 3 |
| sodium oleate | 0.8 |
| (or sucrose fatty acid ester | 1) |
| water | 100 |

The grain size of the particles in the suspension thus prepared was 5 microns with both emulsifiers.

In this suspension, grapefruits were immersed for 1 to 2 seconds and were then dried in a stream of air to form a coating membrane covering the outer surfaces of the grapefruits. These grapefruits were then stored at room temperature for 60 days and compared with control grapefruits without surface processing but stored under the same conditions with respect to citric acid content, brix, and loss in weight. The results were as follows.

Weight loss:

| Days lapsed | Grapefruits of the invention | Control grapefruits |
| --- | --- | --- |
| 15 | & 2.3 % | & 5.1 % |
| 30 | 4.2 % | 9.3 % |
| 60 | 10.1 % | 16.9 % |

Brix and Citric acid:

| | Grapefruits of the invention | | Control grapefruits | |
| --- | --- | --- | --- | --- |
| Days lapsed | Brix (%) | Acid (%) | Brix (%) | Acid (%) |
| 0 | 7.9 | 0.96 | 7.9 | 0.96 |
| 30 | 7.8 | 0.94 | 7.7 | 0.90 |
| 60 | 7.8 | 0.93 | 7.6 | 0.86 |

As is indicated by the above results, the grapefruits processed in accordance with this invention exhibited better results than the control grapefruits with respect to citric acid content, brix, and weight loss. Furthermore, the grapefruits processed according to the invention did not show any change in both sarcocarp hardness during storage of 90 days but, in contrast, the control grapefruits exhibited severe wilting during storage of 20 days.

EXAMPLE 11

A beeswax suspension of a particle size of approximately 2 microns was prepared with the following recipe by ordinary procedure.

| First liquid | Parts by weight |
| --- | --- |
| beeswax | 10 |
| sodium oleate | 0.8 |
| (or sucrose fatty acid ester | 1) |
| water | 80 |

A second liquid was prepared with the following recipe as described below.

| Second liquid | Parts by weight |
| --- | --- |
| acacia (gum arabic) | 2 |
| salt (NaCl) | 0.4 |
| water | 20 |

First, the acacia was added to the water and dissolved under heating. After complete dissolution of the acacia, the salt was added to the resulting solution to produce the second liquid.

In the use of these liquids, 22.4 parts by weight of the second liquid was added to 92 parts by weight of the first liquid, and the resulting mixture was made homogeneous by thorough agitation.

In the liquid thus prepared, "Unshu" mandarin oranges (Citrus Unshu) were immersed and the coating layers were then dried in a stream of air. The oranges thus coated were stored in a storage warehouse.

As a result of inspection of these oranges after 3 months, it was found that the decrease in weight thereof was approximately one half of that of unprocessed oranges similarly as in Example 1 and that, as a result of the salting effect of the salt added in a quantity of approximately 30 percent into the membrane on the surfaces of the oranges, the number of instances of decaying was very small as indicated below.

| Decaying (%) after 3 months | |
| --- | --- |
| Processed oranges | 2.6 % |
| Unprocessed oranges | 15.2 % |

It was found further that a liquid prepared by blending the above defined first and second liquids from the beginning to form a single liquid coagulated on the third day after preparation because of breakdown of the dispersion due to the fact that salt (NaCl) is an electrolyte, but a combination prepared as two separate liquids in the state of a "kit" withstood long-period storage and then, when the two liquids were mixed at the time of use, produced a liquid which amply retained its dispersion state during the work period.

What is claimed is:

1. A composition for the preservation processing of agricultural products which carry on living functions after harvesting selected from the group consisting of fruits, vegetables and grain as well as for the preservation processing of the unshelled eggs of fowl, said composition consisting essentially of an aqueous dispersion of microparticles of a hydrophobic substance, as a dispersoid, selected from the group consisting of natural waxes, vegetable fatty oils, hydrogenated fatty oils, and mineral oils, said hydrophobic substance being dispersed in an aqueous solution of a water-soluble high polymer and an emulsifier as the dispersion medium, said water-soluble high polymer being selected from the group consisting of polysaccharides, polysaccharide derivatives, proteins, alginates, and polyvinyl alcohols and said emulsifier selected from the group consisting of a sucrose fatty acid ester, lecithin and an alkali metal salt of oleic acid; the ratio of the volume of hydrophobic substance to the volume of the high polymer being in the range of 10:1 to 10:5 and the content of the hydrophobic substance in the dispersion being in the range of 3–20%, said microparticles of hydrophobic substance being of a particle size range of from 0.1 micron to 10 microns, and wherein said emulsifier is used in amounts necessary to maintain the microparticles of hydrophobic substance dispersed within the dispersion medium within said size range, said composition having a viscosity in the order of from 3 to 50 cps at about room temperature, and said composition, in use, being applied as a coating layer to cover the outer surface of said agricultural product or the said eggs of fowl and dried thereby to form a coating membrane made up of said microparticles dispersed in a matrix of the membrane of said water-soluble high polymer, said coating membrane being characterized by having fine continuous microvoids formed between said microparticles and said matrix, said membrane serving to controllably suppress the respiration of the agricultural product or to preserve the eggs.

2. A composition as claimed in claim 1, in which the difference between the solubility parameters of said water-soluble high polymer substance and said hydrophobic substance is of the order of from 3 to 15.

3. A composition as claimed in claim 1 in which said water-soluble high polymer, said hydrophobic substance and said emulsifier are materials selected from the group consisting of edible materials and materials which will impart no harmful effects to the human body if incepted thereby.

4. A composition according to claim 1 wherein the emulsifier is used in an amount of 0.2 to 10% based on the amount of the hydrophobic substance.

5. A composition according to claim 1, wherein the content of the hydrophobic substance in the dispersion is in the range of 5–15%.

6. A composition according to claim 1 in which the hydrophobic substance is beeswax.

7. A composition according to claim 1 wherein the emulsifier is a sucrose fatty acid ester.

8. A composition according to claim 1 wherein the emulsifier is lecithin.

9. A composition according to claim 1 wherein the emulsifier is an alkali metal salt of oleic acid.

10. A process for preserving agricultural products which carry on living functions after harvesting selected from the group consisting of fruits, vegetables and grain or for the preservation processing of the unshelled eggs of fowl which comprises applying an aqueous dispersion of a coating layer to cover the outer surfaces of said agricultural products or the said eggs of fowl, said aqueous dispersion being prepared by dispersing a hydrophobic substance selected from the group consisting of natural waxes, vegetable fatty oils, hydrogenated fatty oils, and mineral oils in the form of microparticles in an aqueous solution of a water-soluble high polymer and an emulsifier constituting a dispersion medium, said water-soluble high polymer selected from the group consisting of polysaccharides, polysaccharide derivatives, proteins, alginates, and polyvinyl alcohols and said emulsifier selected from the group consisting of a sucrose fatty acid ester, lecithin and an alkali metal salt of oleic acid; the ratio of the volume of hydrophobic substance to the volume of the high polymer being in the range of 10:1 to 10:5 and the content of the hydrophobic substance in the dispersion being in the range of 3–20%, said microparticles of hydrophobic substance being of a particle size range of from 0.1 micron to 10 microns, and wherein said emulsifier is used in amounts necessary to maintain the microparticles of hydrophobic substance dispersed within the dispersion medium within said size range, said composition having a viscosity in the order of from 3 to 50 cps at about room temperature, and drying the dispersion thus applied to form a coating membrane consisting essentially of said microparticles dispersed in a matrix of the membrane of said water-soluble high polymer and wherein the coating membrane is characterized by having fine continuous microvoids formed between said microparticles and said matrix, thereby to controllably suppress the respiration of the agricultural products or preserve the eggs.

11. A process as claimed in claim 10, in which the difference between the solubility parameters of said water-soluble high polymer substance and said hydrophobic substance is of the order of from 3 to 15.

12. A process as claimed in claim 10, in which said water-soluble high polymer, said hydrophobic substance and said emulsifier are materials selected from the group consisting of edible materials and materials which will impart no harmful effects to the human body if incepted thereby.

13. A process according to claim 10, in which the emulsifier is used in amounts of 0.2 to 10% based on the amount of hydrophobic substance.

14. A process according to claim 10, wherein the content of the hydrophobic substance in the dispersion is in the range of 5–15%.

15. A process according to claim 10, wherein the hydrophobic substance is beeswax.

16. A process according to claim 10, wherein the emulsifier is a sucrose fatty acid ester.

17. A process according to claim 10, wherein the emulsifier is lecithin.

18. A process according to claim 10, wherein the emulsifier is an alkali metal salt of oleic acid.

19. A preservation-processed product consisting essentially of (a) an agricultural product which carries on living functions after harvesting selected from the group consisting of fruits, vegetables and grains; or the unshelled eggs of fowl and (b) a membrane covering the outer surface of said agricultural product or said unshelled eggs consisting essentially of a water-soluble high polymer substance constituting a matrix and microparticles of a hydrophobic substance dispersed in said matrix; said hydrophobic substance being selected from the group consisting of natural waxes, vegetable fatty oils, hydrogenated fatty oils and mineral oils and said water-soluble high polymer substance selected from the group consisting of polysaccharides, polysaccharide derivatives, proteins, alginates and polyvinyl alcohols, said membrane being of a thickness of from 3 to 100 microns, and said dispersed microparticles being of a particle size of from 0.1 micron to 10 microns within the membrane, said membrane having fine continuous voids between said matrix and said microparticles, which microvoids serve to controllably suppress the respiration of the agricultural product and to preserve the eggs.

20. A preservation-processed product according to claim 19, in which the difference between the solubility parameters of said water-soluble high polymer substance and said hydrophobic substance is in the order of from 3 to 15.

21. A preservation-processed product according to claim 19, in which said water-soluble high polymer and said hydrophobic substance are materials selected from the group consisting of edible materials and materials which will impart no harmful effects to a human body if incepted thereby.

22. A preservation-processed product according to claim 19, in which the hydrophobic substance is beeswax.

* * * * *